United States Patent [19]

Ho

[11] Patent Number: 5,079,702

[45] Date of Patent: Jan. 7, 1992

[54] PHONETIC MULTI-LINGUAL WORD PROCESSOR

[76] Inventor: Paul Ho, 523 N. Palm Ave., Unit B, Alhambra, Calif. 91801

[21] Appl. No.: 572,884

[22] Filed: Aug. 27, 1990

Related U.S. Application Data

[63] Continuation-in-part of Ser. No. 493,619, Mar. 15, 1990.

[51] Int. Cl.$^5$ ............................................. G06F 15/38
[52] U.S. Cl. ............................................................ 364/419
[58] Field of Search ................ 364/419, 900 MS File

[56] References Cited

U.S. PATENT DOCUMENTS 4,484,305  11/1984  Ho ........................................ 364/900
4,621,340  11/1986  Pokorny et al. ..................... 364/900

Primary Examiner—Dale M. Shaw
Assistant Examiner—Xuong M. Chung

[57] ABSTRACT

A word processor using a standard United States keyboard which enables desired Chinese characters to be displayed by virtue of a phonetic selection of the consonant and vowel of the words represented by the various characters by the actuation of the letter keys of the keyboard; and by virtue of the selection of the first and last calligraphic strokes of the respective characters by actuation of the symbol keys on the standard keyboard which simulate the shape of such strokes.

7 Claims, 1 Drawing Sheet

PHONETIC MULTI-LINGUAL WORD PROCESSOR

This application is a continuation-in-part of copending application Ser. No. 493,619, filed Mar. 15, 1990, in the name of the present invention.

BACKGROUND OF THE INVENTION

A problem which has been considered to be virtually insolvable in the past is that of providing apparatus with a practical keyboard so as to enable Chinese and Japanese characters, and the like, to be typed at practical speeds. Linguistic and word processor experts have been working on various complex keyboard arrangements and coding schemes in an effort to solve the problem. However, a major stumbling block in producing a computer-readable Chinese code is that of providing an efficient means for entering data to select the Chinese symbols which represent the various words.

A system has been developed at Cornell University by Paul L. King which uses a twelve digit keyboard to enter 10,000 Chinese characters. Each digit describes a basic shape used in Chinese characters in one of four quadrants into which all of the characters are divided. By selecting up to four keys, an operator can identify an entire character. A system is disclosed in U.S. Pat. No. 4,484,305 which issued Nov. 20, 1984 in the name of the present invention in which, and in a manner similar in some respects to the King system, a simple keyboard is used so that characters may be selected on a phonetic basis. However, unlike the King system no attempt is made in the system of the patent to form the characters on a quadrant basis. Instead, unless precise tones are selected, all characters corresponding to the phonetic selection initiated by the operator, but having different meanings, are displayed, so that the operator may make a manual selection of the proper characters from the displayed group.

The system of the present invention represents an even simpler approach to the problem than was disclosed in U.S. Pat. No. 4,484,305. In the system of the invention, a word processor using a standard United States keyboard is provided which enabled any desired Chinese character to be selected by the phonetic identification of the consonant and vowel of the word represented by the character, and by the identification of the first and last calligraphic stroke of the character. Specifically, for each word, a selected key in a first group of standard letter keys of the keyboard is operated to constitute a phonetic selection of the consonant of the desired word; a selected key in a second group of standard letter keys of the keyboard is then operated to constitute a phonetic selection of the vowel of the desired word; and selected symbol keys on the standard keyboard are then operated to select the first and last calligraphic strokes of the desired character, the standard symbol keys simulating the shape of the first and last calligraphic strokes.

It has been determined that virtually all Chinese characters may be individually identified by phonetically identifying the consonant and vowel of the word represented by any particular character, and then by identifying the first and last calligraphic strokes of the character. No further information is required in order to identify any individual character.

It has also been observed that the symbol keys on a standard United States keyboard simulate the shapes of the first and last calligraphic strokes of the Chinese characters. This enables anyone familiar with the Chinese characters to select the symbol keys corresponding to the first and last calligraphic strokes of any desired character.

Accordingly, in the practice of the present invention, a word processor is provided having a dictionary stored in its memory which enables the processor to display selected Chinese characters on its screen when the memory is selectively addressed by the selective actuation of the keys of the keyboard.

The operator, who is familiar with Chinese characters, then operates a first letter key on the standard keyboard which is the phonetic equivalent of the consonant of the word represented by the desired character; the operator then operates the letter key which is the phonetic equivalent of the vowel of the word; the operator then operates the symbol key of the standard keyboard which simulates the shape of the first calligraphic stroke of the desired character; and the operator then operates the symbol key of the standard keyboard which simulates the shape of the last calligraphic stroke of the desired character.

As mentioned above, the information described in the preceding paragraph is all that is required to identify any individual character. Accordingly, as the four selected keys of the keyboard are operated in the selected sequence, a corresponding memory cell in the memory of the processor is addressed, and the desired character is displayed on the screen. Unlike the system of U.S. Pat. No. 4,484,305, the desired character is displayed by itself, instead of being part of a number of characters displayed on the screen, and there is no need for the operator to select the desired character from the group of displayed characters.

SUMMARY OF THE INVENTION

A word processor using a standard United States keyboard is provided which enables a desired Chinese character to be selected by virtue of a phonetic selection of the consonant and vowel of the word represented by the character, this being achieved by the actuation of standard letter keys of the keyboard; and by virtue of selecting the first and last calligraphic strokes of the character by the actuation of symbol keys on the standard keyboard which simulate the shape of the strokes.

DETAILED DESCRIPTION OF THE ILLUSTRATED EMBODIMENT

Figure 1:
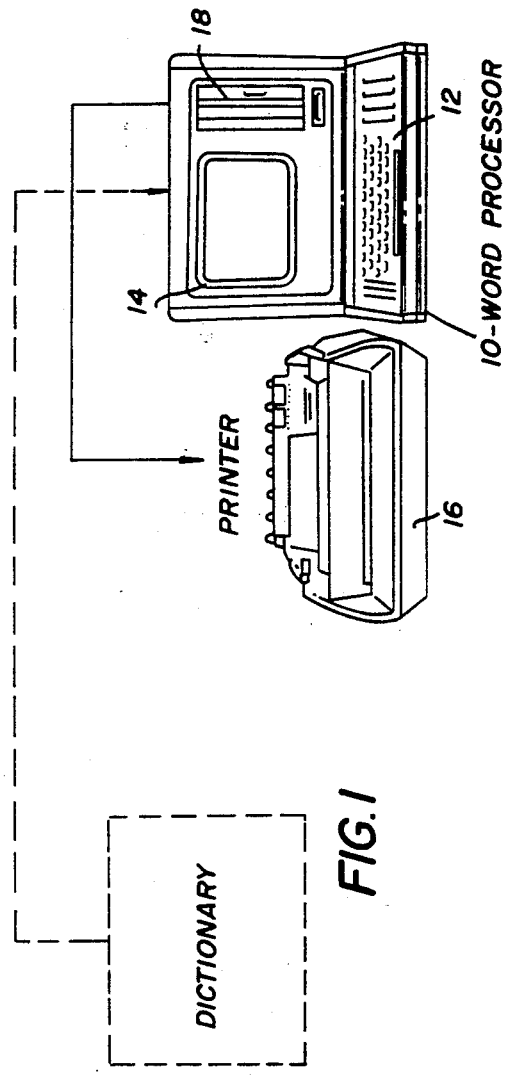
FIG. 1 is a representation of a typical present-day word processor which is constructed to carry out the functions required in practicing the present invention.
Figure 2:
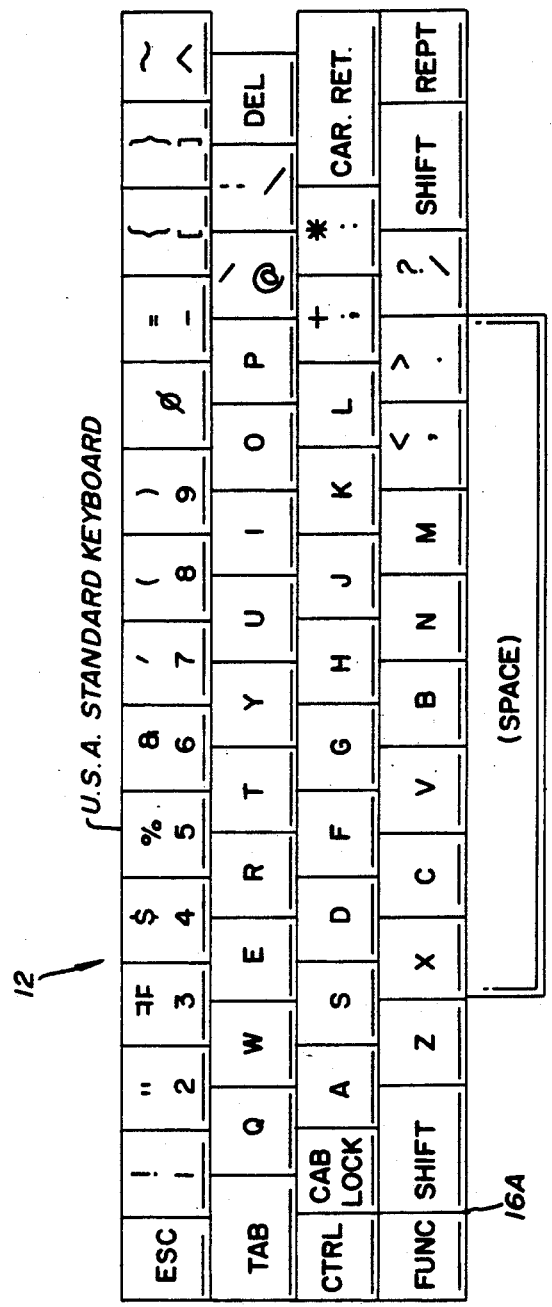
FIG. 2 is a schematic representation of the standard keyboard of the word process of FIG. 1.

As shown in FIGS. 1 and 2, the invention provides a typical word processor 10 having a standard keyboard 12. As stated above, the word processor has a dictionary stored in its memory which causes selected Chinese characters to be displayed on screen 14, as the memory is addressed by the selective operation of the selected keys.

Specifically, and as explained above, for each word to be represented by a selected Chinese character, a key of keyboard 12 from a first group of letter keys is operated to constitute a phonetic selection of the consonant of the desired word; a key of a second group of letter keys of keyboard 12 are then operated to constituted a phonetic selection of the vowel of the desired word; and the selected symbol keys of the keyboard are then operated in sequence to select the first and last calligraphic strokes of the desired character, the shape of these strokes being simulated by the symbol keys. As the selected keys of keyboard 12 are operated in the selected sequence, a particular memory cell in the memory of processor 10 is addressed to cause the processor to display the desired character on screen 14.

The selection process of each character is repeated until a complete page of selected characters appears on screen 14 of processor 10. The data is then transferred to a disc 18 for subsequent print-out by printer 16. The word processor 10 may also be adapted to other languages, such as Japanese, Korean, and the like.

For each Chinese word in the operation of word processor 10, the consonant is phonetically selected followed by the phonetic selection of the vowel by operating selected letter keys on keyboard 12, as described above. The character corresponding to the particular word is then completed by operating selected symbol keys of keyboard 12 which simulate the first and last strokes of the selected character. For example, the 23 consonants used in the Chinese language are as follows:

| B  | C  | D  | F | G | H | J | K | L | M |
|----|----|----|---|---|---|---|---|---|---|
| N  | P  | Q  | R | S | T | W | X | Y | Z |
| Ch | Sh | Zh |   |   |   |   |   |   |   |

The consonants B, C, D, F, G, H, J, K, L, M, N, P, Q, R, S, T, W, X, Y, Z, are phonetically selected by operating the corresponding letter keys on keyboard 12, and consonants Ch, Sh and Zh can be arbitrarily assigned various additional keys on the keyboard.

Then, the 34 vowels used in the Chinese language may be selected as follows:

| Group 1 | A  | Ai | An  | Ang  | Ao  |    |    |
| Group 2 | E  | Ei | En  | Eng  | Er  |    |    |
| Group 3 | I  | Ia | Ian | Iang | Iao |    |    |
|         | Ie | In | Ing | Iong | Iu  |    |    |
| Group 4 | O  | Ong | Ou |      |     |    |    |
| Group 5 | U  | Ua | Uai | Uan  | Uang | Ue | Ui |
|         |    | Un | Uo  | UU   |      |    |    |

The vowels A, E, I, 0, U are phonetically selected by operating corresponding letter keys of keyboard 12, and the vowels which have two letters or more may be arbitrarily assigned additional keys on the keyboard.

Twenty symbol keys on the keyboard 12 of FIG. 2 may then be selectively operated to select the first and last calligraphic strokes of each of the desired characters which are simulated by the symbol keys. These are shown as follows:

| symbol key | first/last stroke | examples |
|---|---|---|
| "…" | first | ．．丶丿丶ᅦ丿丶 |
|  | last | ㅅ一丶乚乚乚丶乚 |
| "/" | first | ㅌ丿丿丿丶ㅌ日 |
|  | last | ㅂㄣ |
| ")" | first | 刀月尸币刂 |
|  | last | 刂 |
| "-" | first | 大示丁王 |
|  | last | 王里里 |

| symbol key | first/last stroke | examples |
|---|---|---|
| "" | last | 大主丶乚乚 |
| "\|" | first | 里中申用比中具 |
|  | last | 中丨肀卝丌王丰丰 |
| "@" | first | 乙 |
|  | last | 飞乙乚乙己己巴巴乚 |
| "#" | first | 禾口 |
| (The center of this symbol looks like □, not like ◻. The whole shape is simile to 甘 .) The symbol % is for 口 . |
| "$" | first | 忄 |
| "%" | first | 口只兄 |
|  | last | 和兄 |
| " " | first | 人宀人夂亻亻 |
| "&" | first | 七乚乚丶 |
|  | last | 置乚乚乚 |
| "*" | first | ＊ 日日月 |
| (This symbol means STAR. Sun and moon are stars.*) But the shape looks like *) |
| "+" | first | 十土土木｜一扌廿 |
|  | last | 十千辛キ十 |
| "=" | first | 冫冫冫冫冫戒 |
| "[" | first | 日目日丨曰 |
|  | last | 丨曰 |
| "]" | first | ㄷㄹㄹㅂㅂㄹㄹㄹ尸 |
|  | last | 刀力 彳ㅔ己丰 |
| "<" | first | 人人人亻亻 |
|  | last | 冫冫冫 |
| ">" | first | 幺ㄏ乃丁丁 |
|  | last | 乃 |
| "!" | first | 其 |
|  | last | 其 |

Mathematically there are 23×34×20=15640 permutations per Chinese character. Therefore, the likelihood of having the same code for two characters is zero for all practical purposes. Should such an eventuality occur, however, a function key on the keyboard may be assigned to select the desired character.

In the practice of the present invention, there is no need for changing or re-marking the keys of the standard United States keyboard in order to enable the operator to type out selected Chinese characters, as was required in most prior art mechanisms. Instead, key selection in the present invention is predicated on the operator's existing phonetic knowledge and regular keyboard skills.

The process may be further speeded up by use of coding phrases rather than a single word. This use of coding phrases may be achieved as follows:

(1) 2-Chinese character phrase: Enter the consonant and vowel of each character.

(2) 3-Chinese character phrase: Enter the consonant and vowel of the first character, and only the consonant of the second and third character.

(3) 4 or more Chinese character phrases: Enter only the consonant of each character or file name.

The invention provides, therefore, an improved and simplified phonetic multi-lingual word processor using a standard keyboard, by which Chinese characters, and the like, may be displayed on the screen, and subsequently printed, by the operation of selected keys of the keyboard.

It will be appreciated that while a particular embodiment of the invention has been shown and described, modifications may be made. It is intended in the claims to cover all modifications which come within the true spirit and scope of the invention.

I claim:

1. A multi-lingual word processor combining phonation and strokes for producing Chinese characters, and the like, with each character representing a particular word having a constant, a vowel and first and last calligraphic strokes, said processor comprising: a standard United States keyboard having letter keys and symbol keys, and internal memory means connected to said keyboard for storing a dictionary of Chinese characters from which selected Chinese characters are derived, first by order of the consonant of the word represented by a particular character by actuation of a phonetically selected letter key on the keyboard from keys located in a first group, then by the vowel of the word represented by the particular character by the actuation a phonetically selected letter key on the keyboard from a plurality of keys in a second group, and completed by the actuation of selected symbol keys on the keyboard which simulate the first and last calligraphic strokes of the character representing the particular word.

2. The phonetic multi-lingual word processor defined in claim 1, and which includes a screen connected to the internal memory means for displaying the characters derived from the memory means, and a memory disk connected to the memory means for storing the characters appearing on the screen.

3. The phonetic multi-lingual word processor defined in claim 1, in which the stored dictionary includes coded Chinese phrases to be selected by the actuation of selected keys of the keyboard.

4. The phonetic multi-lingual word processor defined in claim 3, in which the Chinese phrases are coded as follows:
(1) 2-Chinese character phrases; enter the consonant and vowel of each character;
(2) 3-Chinese character phrase, enter the consonant and vowel of the first character, and only the consonant of the second and third character;
(3) 4-or more Chinese character phrases, enter only the consonant of each character.

5. The phonetic multi-lingual word processor defined in claim 1, in which said keys of said keyboard in said first group are detailed in the following manner:

| B | C | D | F | G | H | J | K | L | M |
|---|---|---|---|---|---|---|---|---|---|
| N | P | Q | R | S | T | W | X | Y | Z |
| Ch | Sh | Zh. | | | | | | | |

6. The phonetic multi-lingual word processor defined in claim 1, in which said keys of said keyboard in said second group are detailed in the following manner:

| Group 1 | A | Ai | An | Ang | Ao | | |
|---|---|---|---|---|---|---|---|
| Group 2 | E | Ei | En | Eng | Er | | |
| Group 3 | I | Ia | Ian | Iang | Iao | | |
| | Ie | In | Ing | Iong | Iu | | |
| Group 4 | O | Ong | Ou | | | | |
| Group 5 | U | Ua | Uai | Uan | Uang | Ue | Ui |
| | Un | Uo | Uu | Uue. | | | |

7. The phonetic multi-lingual word processor defined in claim 1, in which said symbol keys are detailed in the following manner:

| symbol key | first/last stroke | examples |
|---|---|---|
| "⸱" | first | ⸱⸱⸱⸱⸱⸱⸱ |
| | last | ⸱⸱⸱⸱⸱⸱ |
| "/" | first | ⸱⸱⸱⸱⸱⸱⸱ |
| | last | ⸱⸱ |
| ")" | first | ⸱⸱⸱⸱⸱ |
| | last | ⸱ |
| "-" | first | 太元天王 |
| | last | 王里皇 |
| " " | last | 大义北LL |
| "\|" | first | ⸱⸱⸱⸱⸱⸱⸱ |
| | last | ⸱⸱⸱⸱⸱⸱⸱ |
| "@" | first | 乙 |
| | last | ⸱⸱⸱⸱⸱⸱ |
| "#" | first | 和口 |

(The center of this symbol looks like 口, not like 日. The whole shape is simile to 井.)
The symbol % is for

| "$" | first | 手手 |
| "%" | first | 口吳哭 |
| | last | 扣吉 |
| " " | first | 人合人水永勺忄 |
| "&" | first | 弋戈弧飞 |
| | last | ⸱狄民式氏 |
| "*" | first | |

(This symbol means STAR. Sun and moon are stars. But the shape looks like *)

| "+" | first | 十士土木扌艹車打 |
| | last | 千干垮军早 |
| "=" | first | 氵冫詳高況洹 |
| "[" | first | 監卵日另閃巨 |
| | last | 虚店奖 |
| "]" | first | 已己巳酉塞翼羽尸 |
| | last | 刀力 彳厶彐 |
| "<" | first | 厶丛幺钅女 |
| | last | 水冰永 |
| ">" | first | 水阝癸子予 |
| | last | 乃 |
| "!" | first | 艮 |
| | last | 艮 |

* * * * *